(12) United States Patent
Fischer et al.

(10) Patent No.: US 6,229,817 B1
(45) Date of Patent: May 8, 2001

(54) SYSTEM AND METHOD FOR PROGRAMMING LATE COLLISION SLOT TIME

(75) Inventors: Jenny Liu Fischer, Mountain View; Ching Yu, Santa Clara; Jeffrey Dwork, San Jose, all of CA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 0 days.

(21) Appl. No.: 08/993,127

(22) Filed: Dec. 18, 1997

(51) Int. Cl.[7] .................................................. G06F 15/16
(52) U.S. Cl. ........................ 370/445; 370/447; 370/461; 370/468
(58) Field of Search ..................................... 370/230, 231, 370/235, 245, 252, 402, 445, 447, 458, 461, 448, 468

(56) References Cited

U.S. PATENT DOCUMENTS 5,321,819 * 6/1994 Szczepanek ........................... 370/445
5,329,519 * 7/1994 L'Anson ................................ 370/445
5,572,511 * 11/1996 Ouyang et al. ....................... 370/447
5,664,105 * 9/1997 Keisling et al. ...................... 370/447

* cited by examiner

*Primary Examiner*—Wellington Chin
*Assistant Examiner*—Frank Duong

(57) ABSTRACT

A system for adjusting late collision slot time is provided in a network interface having a media access control (MAC) engine that performs collision detection. The MAC engine comprises a MAC transmit block that transmits frames via a media independent interface (MII) to an ektemal physical layer device (PHY) coupled to the MII, and a MAC receive block for receiving frames from the PHY. A MAC control register is configured for storing ablate collision time slot adjustment value used to adjust the late collision slot time. The late collision time slot adjustment value is programmed to compensate for variations in internal delays of PHYs that may be connected to the MII.

11 Claims, 3 Drawing Sheets

SYSTEM AND METHOD FOR PROGRAMMING LATE COLLISION SLOT TIME

FIELD OF THE INVENTION

The present invention relates to data networks,;and more particularly, to a system for adjusting slot time for late collision.

BACKGROUND ART

When two packets collide, the medium in a data network may remain unusable for the duration of transmission of both damaged packets. For packets that are long compared to propagation time, the amount of wasted capacity can be considerable. This waste can be reduced if a station continues to listen to the medium while it is transmitting.

The most commonly used medium access control technique for bus/tree topologies is carrier sense multiple access with collision detection (CSMA/CD). For the Ethernet network, the ANSI/IEEE Standard 802.3 (ISO/IEC 8802-03, 1996) requires a media access control (MAC) engine in a CSMA/CD communication station to monitor the medium for traffic. If a collision is detected during transmission, the transmitted frame is aborted, and a brief jamming sequence is produced to assure that all stations in the network know that there has been a collision. After the jamming sequence is transmitted, the communication station attempts to transmit the aborted frame again.

In accordance with the ANSI/IEEE Standard 802.3, if a collision is detected after the preamble of a frame is completed, but prior to 512 bits being transmitted, the MAC engine will abort the transmission and append the jam sequence immediately. The jamming sequence is a 32-bit all zeros pattern. The MAC engine will attempt to transmit a frame a total of 16 times.

If a collision is detected after 512 bits have been transmitted, the collision is termed a late collision. In this case, the MAC engine will abort the transmission, and append the jam sequence. No retry attempt will be scheduled on detection of the late collision, and the transmitted message will be discarded.

Thus, the ANSI/IEEE Standard 802.3 establishes a late collision slot time for a collision detection procedure to retry the transmission of a frame if a collision is detected within the late collision slot time, and to discard the frame if a collision is detected outside the late collision slot. However, different physical layer devices (PHY) can have different internal delays for collision detection. As a result, false detection of the late collision can occur, when the collision actually occurs within the late collision slot time.

Thus, it would be desirable to provide a system for adjusting the late collision slot time to prevent the false late collision detection.

DISCLOSURE OF THE INVENTION

Accordingly, a primary object of the present invention is to provide a system for adjusting a late collision slot time to prevent false late collision detection.

The above and other advantages of the invention are achieved, at least in part, by providing a data communications network for supporting data exchange between a plurality of communication stations. The network comprises a collision detection circuit for detecting a collision during transmission of a frame. The collision detection circuit is configured to detect a late collision condition if the collision occurs after a preset number of bits of the frame have been transmitted. The frame is being retransmitted if the collision occurs prior to the transmission of the preset number of bits. However, the frame is discarded without retransmission if the collision occurs after the preset number of bits have been transmitted.

A late collision adjustment circuit is provided to control the collision detection circuit so as to adjust the preset number of bits in accordance with network conditions. The late collision adjustment circuit may comprise a register that stores a late collision adjustment value programmed in accordance with the network conditions.

For example, the late collision adjustment circuit may control the collision detection circuit to compensate for internal delays of a device configured to receive the frame.

In accordance with another aspect of the invention, network interface is provided to support data exchange between a host computer and a network. A media access controller provides an interface to a physical layer device arranged in the network. The media access controller is configured to detect a collision during transmission a frame to the physical layer device. A late collision slot time programming circuit is coupled to the media access controller for programming a value of late collision slot time, within which the collision is identified as being legal.

For example, the late collision slot time programming circuit may increase a late collision slot time defined by the ANSI/IEEE Standard 802.3 to compensate for internal delays in the physical layer device.

In accordance with the method of the present invention the following steps are carried out for providing data transmission:

- detecting a collision during transmission of a frame,
- retransmitting the frame if the collision occurs within late collision slot time,
- discarding the frame if the collision occurs after the late collision slot time, and
- adjusting the late collision slot time in accordance with transmission conditions.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be rewarded as illustrative in nature, and not as restrictive.

BEST MODE FOR CARRYING OUT THE INVENTION

The present invention will be described with the example of a network interface in a packet switched network, such as an Ethernet (IEEE 802.3) network. A description will first be given of a network interface architecture. It will become apparent. however, that the present invention is also applicable to other network interface systems.

Figure 1A:
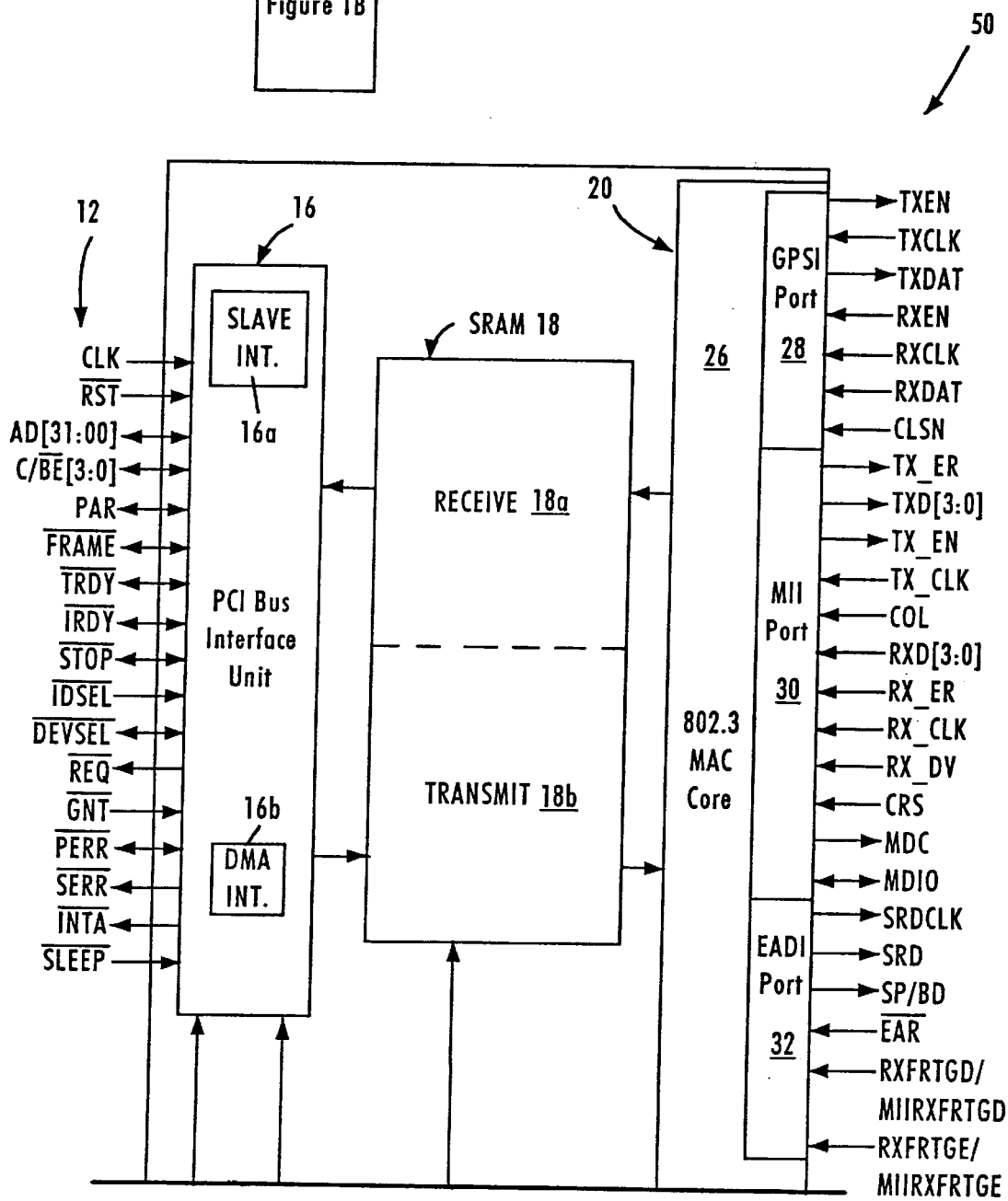
FIG. 1 is a block diagram illustrating an exemplary network interface which may be used for initialization independent from a network data clock according to an embodiment of the present invention.
Figure 1B:
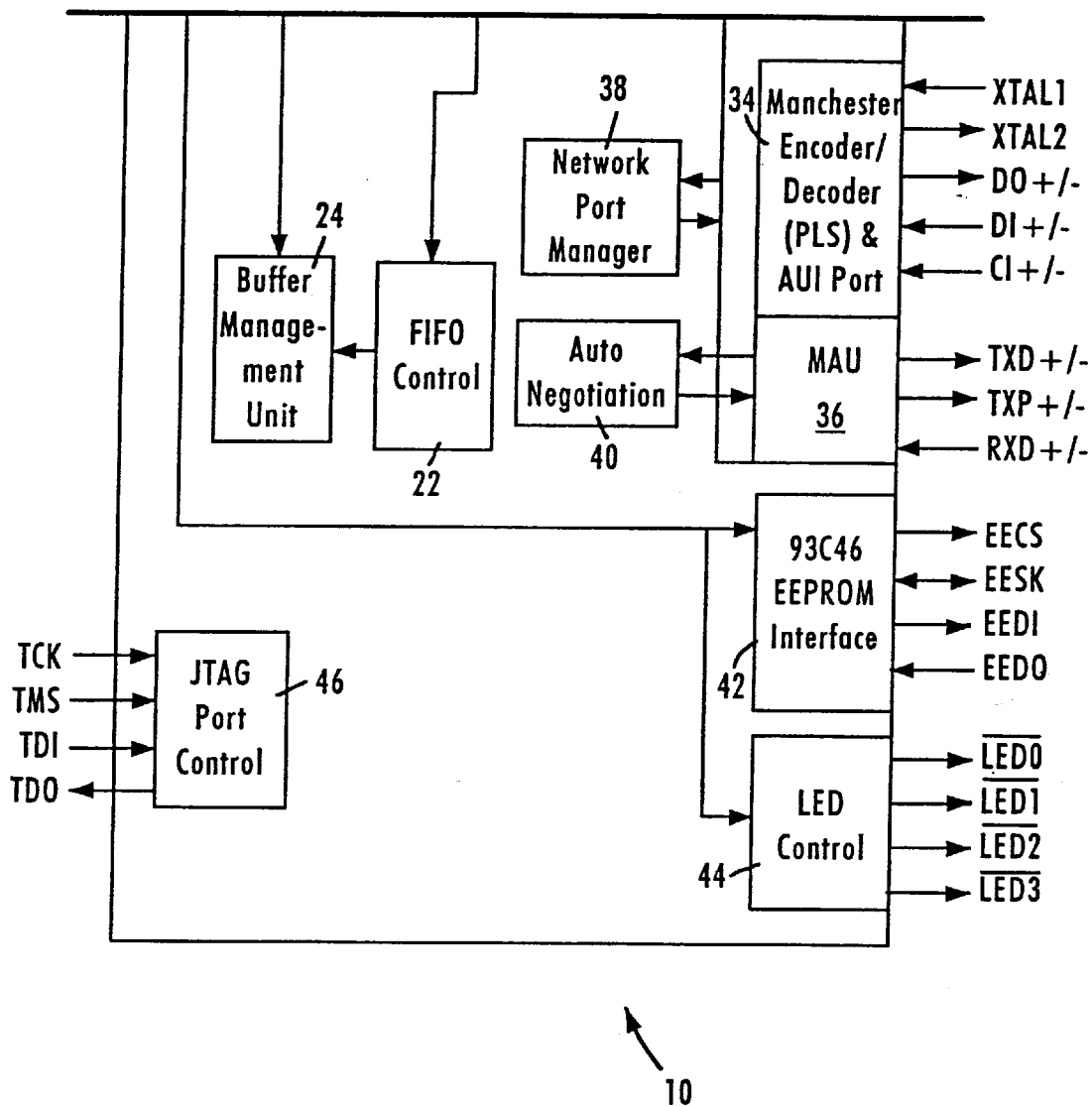

FIG. 1 is a block diagram of an exemplary network interface 10 that accesses the media of an Ethernet (ANSI/IEEE 802.3) network according to an embodiment of the present invention.

The network interface 10, preferably, a single-chip, 32-bit Ethernet controller, provides an interface between a local bus 12 of a computer, for example a peripheral component interconnect (PCI) local bus, and an Ethernet-based media 50.

The interface 10 includes a PCI bus interface unit 16, a buffer memory portion 18, and a network interface portion 20. The PCI bus interface unit 16 includes a PCI slave interface 16a and a DMA interface 16b. The slave interface 16a manages PCI control and status information including reading and programming of the PCI status registers, but may also be configured for managing slave transfers via the PCI bus with a host CPU. The DMA interface 16b manages DMA transfers by the network interface 10 to and from system memory. Hence, the PCI bus interface unit 16 can be selectively configured for PCI transfers in slave and/or master (e.g., DMA) mode.

The memory portion 18 includes a 16-bit SRAM implemented directly on the network interface chip 10. According to the disclosed embodiment, the SRAM 18 may be accessed in a random access manner under the control of a first in, first out (FIFO) control unit 22, or may be segmented into a receive portion 18a and a transmit portion 18b for receive and transmit paths, respectively.

The network interface 10 also includes a buffer management unit 24 configured for managing DMA transfers via the DMA interface 16b. The buffer management unit 24 manages DMA transfers based on DMA descriptors in host memory that specify start address, length, etc. The buffer management unit 24 initiates a DMA read 1from system memory into the transmit buffer 18b by issuing an instruction to the DMA interface 16b, which translates the instructions into PCI bus cycles. Hence. the buffer management unit 24 contains descriptor management for DMA transfers, as well as pointers associated with storing and reading data from the memory portion 18. Although the buffer management unit 24 and the memory controller 22 are shown as discrete components, the two units may be integrated to form a memory management unit controlling all transfers of data to and from the memory unit 18.

The network interface 20 includes a media access control (MAC) core 26, a general purpose serial interface (GPSI) 28, a media independent interface (MII) 30 for connecting to an external 10 Mb/s or 100 Mb/s physical transceiver (PHY), an external address detection interface (EADI) 32, an attachment unit interface (AUI) 34 having a Manchester encoder and decoder, and a 10/100 Mb/s twisted pair transceiver media attachment unit (MAU) 36.

The network interface 10 also includes a network port manager 38 configured for performing MII handshaking between two devices on an MII bus via the MII port 30. Such MII handshaking is performed in accordance with the IEEE 802.3 protocols and may include link and programming information exchange at the MII layer using a management data clock (MDC), and management data input/output (MDIO) paths defined in the IEEE 802.3 standard.

The auto-negotiation portion 40 performs IEEE-compliant negotiation with a link partner on the PHY layer to exchange data indicating whether the link partner is capable of operating at 10 Mb/s, 100 Mb/s, and whether the link should be half-duplex or full-duplex.

The LED controller 44 selectively controls the generation of LED output signals based upon the internal decoding logic and network interface status registers (not shown). The network interface 10 also includes an IEEE 1149.1-compliant JTAG boundary scan test access port interface 36.

The EEPROM interface 42 connects to an EEPROM on either a network interface adapter card or the motherboard of the host computer via a serial interface link. The EEPROM (not shown in FIG. 1) will be programmed with configuration information related to the network interface, enabling the network interface to be configured during initialization via the EEPROM interface 42. Once initialized, the network interface stores the configuration information in internal registers (not shown), enabling the network interface to operate independently of the host computer in the event the host computer is powered down.

Figure 2:
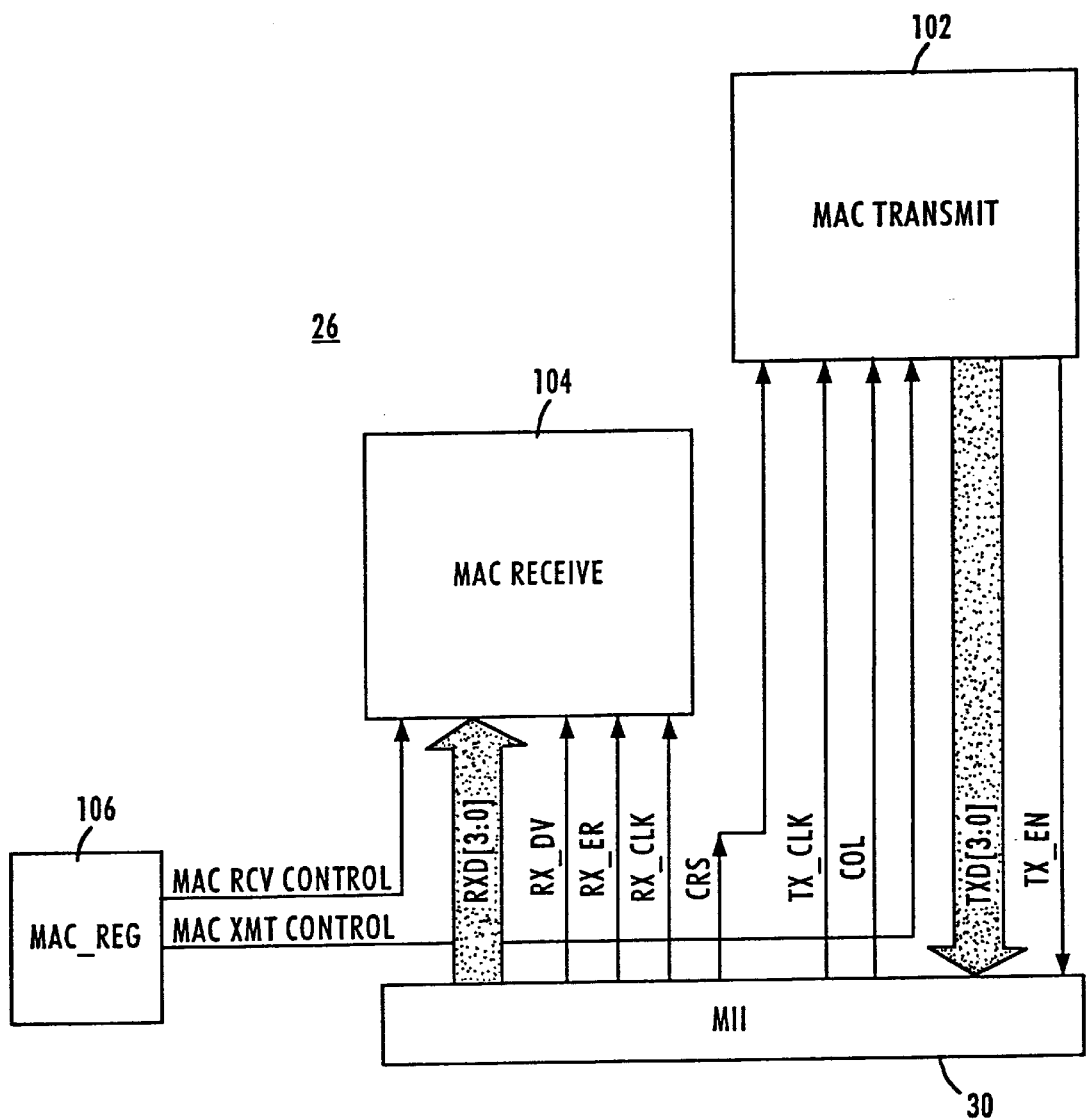
FIG. 2 is a block diagram illustrating MAC elements relating to collision detection.

The MAC core 26 implements a media access mechanism defined by the IEEE 802.3 Ethernet standard, and provides the interface between the memory portion 18 and the PHY through the Mul interface 30. Referring to FIG. 2, the MAC core 26 may include a MAC transmit block 102, a MAC receive block 104, and a MAC register block 106. The MAC transmit block 102 accepts frames from the transmit buffer 18b and transmits them to the PHY. The MAC receive block 104 performs receive operations to receive frames from the PHY and sends them to the receive buffer 18a. The MAC register block 106 contains control registers relating to MAC functions.

A nibble-wide MII transmit data bus TXD[3:0] provides data transmission from the MAC transmit block 102 via the MII 30 to the PHY. A transmit enable signal TX_EN is produced by the MAC transmit block 102 to indicate when valid transmit data is presented on the TXD[3:0] bus. The MAC transmit block 102 is supplied by a transmit clock TX_CLK buffered from the TX_CLK pin of the MII 30. This signal is driven from a PHY and indicates that the PHY is connected to the MII interface. A carrier sense input signal CRS may be applied to the MAC transmit unit 102 from the CRS pin of the MII 30 to indicate that a non-idle medium is detected.

Data from the PHY is supplied via a nibble-wide MII receive data bus RXD[3:0] to the MAC receive block 104. A receive valid data line RX_DV is provided to indicate that valid receive data is being presented on the RXD[3:0] pins, and a receive clock signal RX_CLK is synchronous to the receive data.

The MAC register block 106 contains MAC control registers that store MAC control information programmed in the EEPROM and transferred to the MAC control registers via the EEPROM interface 42. Control data from the MAC control registers is supplied to the MAC transmit block 102 and MAC receive block 104 to control their transmit and receive operations. For example, the MAC control registers controls interframe spacing during transmission, enable the MAC transmit block 102 to retry the transmission of a frame after a collision is detected, and handle abnormal network conditions, such as loss of carrier and late collision.

The MAC core 26 may perform collision detection using a collision active signal COL supplied through the MII 30 via the COL pin. If the collision active signal is detected before the complete preamble/starting frame delimiter (SFD) sequence has been transmitted, the MAC core 26 will complete the preamble/SFD, and produce the jam sequence indicating to other stations in the network that a collision has occurred. The jam sequence may be represented by a 32-bit all zeros pattern.

If a collision is detected after the preamble/FSD fields of a frame is completed, but prior to 512 bits being transmitted, the MAC core 26 will abort the transmission and append the jam sequence immediately. Detection of collision will cause the transmission of the frame to be rescheduled to a time determined by the random backoff algorithm. The MAC core 26 will attempt to transmit a frame a total of 16 times. If all 16 attempts will experience collision, the MAC core 26 will abandon transmission and discard the frame.

In accordance with the ISO 8802-3 (ANSI/IEEE 802.3) standard, if a collision is detected after 512 bits have been transmitted. The collision is considered to be a late collision. In this case, the MAC engine is required to abort the transmission and append the jam sequence, without attempting to retry transmission. Thus the ISO 8802-3 standard establishes a late collision slot time equal to 512 bit times during which a collision is considered to be legal.

However, a time period between the instant, in which the transmission begins, and the instant in which a collision active signal is received, depends on internal delays of a PHY connected to the MII interface 30. Thus, a collision active signal is delayed due to the internal delay of the PHY. As different PHYs may have different internal delays for collision detection, the MAC core 26 can consider a collision to be late, when it actually occurs within the legal limits of the late collision slot time.

To prevent data loss due to false indication of a late collision, the MAC register block 106 comprises a register storing a late collision slot time adjustment value. For example, a 4-bit value may be used to adjust the late collision slot time. The late collision slot time adjustment value may increase the late collision slot time to compensate for the internal delay of a specific PHY connected to the MII 30.

For example, the late collision slot time may be represented by a count produced by a transmit clock counter that may count the number of transmit clocks TX_CLK supplied from the TX_CLK pin of the MII 30. The transmit clock counter may be arranged in the MAC transmit block 102. When the late collision slot time adjustment value is equal to 0, the MAC core 26 will consider a collision to be late it the collision occurs after the transmit clock counter counts 128 transmit clocks representing 512 bit times.

The late collision slot time adjustment value equal to 2 may cause the MAC core 26 to consider a collision to be late only after the transmit clock counter counts 130 transmit clocks representing 520 bit times. As a result, a collision that occurs within 520 bit times will be considered to be legal. Accordingly, the MAC core 26 will attempt to retransmit the frame that experiences a collision after 520 bits have been transmitted.

The late slot time adjustment value may be programmed in accordance with network conditions to accommodate various delays in collision detection. This value man he programmed by a user or a host computer in an EEPROM arranged on either a network interface adapter card or the motherboard of the host computer. Via the EEPROM interface 42, the late slot time adjustment value may be transferred to the MAC register block 106.

There, accordingly, has been described a system for adjusting late collision slot time in a network interface having a media access control (MAC) engine that performs collision detection. The MAC engine comprises a MAC transmit block that transmits frames via a media independent interface (MII) to an external physical layer device (PHY) coupled to the MII, and a MAC receive block for receiving frames from the PHY. A MAC control register is configured for storing a late collision time slot adjustment value used to adjust the late collision slot time. The late collision time slot adjustment value is programmed to compensate for variations in internal delays of PHYs that may be connected to the MII.

In this disclosure, there are shown and described only the preferred embodiments of the invention, but it is to be understood that the invention is capable of changes and modifications within the scope of the inventive concept as expressed herein.

What is claimed is:

1. A data communications network for providing data exchange between a plurality of communication stations, comprising:

a collision detection circuit for detecting a collision during transmission of a frame, said collision detection circuit being configured to detect a late collision condition if the collision occurs after a preset number of bits of said frame has been transmitted; and a late collision adjustment circuit for controlling said collision detection circuit so as to adjust said preset number of bits in accordance with network conditions.

2. The network of claim 1, wherein said frame is being retransmitted if the collision occurs prior to transmission of said preset number of bits.

3. The network of claim 1, wherein said frame is discarded without retransmission if the collision occurs after transmission of said preset number of bits.

4. The network of claim 1, wherein said late collision adjustment circuit comprises a register for storing a late collision adjustment value programmed in accordance with the network conditions.

5. The network of claim 1, wherein said late collision adjustment circuit controls said collision detection circuit to compensate for internal delays of a device configured to receive said frame.

6. A network interface for providing data exchange between a host computer and a network, comprising:

a media access controller for providing an interface to a physical layer device arranged in said network, said media access controller being configured to detect a collision during transmission a frame to said physical layer device; and a late collision slot time programming circuit coupled to said media access controller for programming a value of late collision slot time, within which the collision is identified as being legal.

7. The network interface of claim 6, wherein said late collision slot time value is being programmed in accordance with network conditions.

8. The network interface of claim 6, wherein said late collision slot time programming circuit increases a standard late collision slot time to compensate for internal delays in said physical layer device.

9. The network interface of claim 6, wherein said late collision slot time programming circuit comprises a register for storing late collision slot time adjustment value programmed to adjust a standard late collision slot time value.

10. A method of data transmission comprising the steps of:

detecting a collision during transmission of a frame;

retransmitting said frame if the collision occurs within late collision slot time;

discarding said frame if the collision occurs after the late collision slot time; and adjusting the late collision slot time in accordance with transmission conditions.

11. The method of claim 10, wherein said step of adjusting comprises the step of increasing the late collision slot time to compensate for internal delays in a device arranged to receive said frame.

* * * * *